(12) United States Patent
Page

(10) Patent No.: US 7,318,565 B2
(45) Date of Patent: Jan. 15, 2008

(54) ELECTRIC MOTOR ASSISTED TAKEOFF DEVICE FOR AN AIR VEHICLE

(75) Inventor: Gregory S. Page, Arnold, MD (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 244 days.

(21) Appl. No.: 11/304,535

(22) Filed: Dec. 16, 2005

(65) Prior Publication Data
US 2007/0145182 A1 Jun. 28, 2007

(51) Int. Cl.
*B64F 1/10* (2006.01)
(52) U.S. Cl. .............................. 244/63; 244/54; 244/58
(58) Field of Classification Search ................... 244/63, 244/62, 53 R, 2, 54, 58; 446/57
See application file for complete search history.

(56) References Cited

U.S. PATENT DOCUMENTS

| | | | | |
|---|---|---|---|---|
| 6,568,633 B2 * | 5/2003 | Dunn | ........................... | 244/59 |
| 6,742,741 B1 | 6/2004 | Rivoli | | |
| 2003/0155463 A1 | 8/2003 | Cox et al. | | |

OTHER PUBLICATIONS http://www.masportaviator.com/pdfs/TAXICUPIIReview.pdf.*

* cited by examiner

*Primary Examiner*—Timothy D. Collins
(74) *Attorney, Agent, or Firm*—Edell, Shapiro & Finnan, LLC

(57) ABSTRACT

A takeoff assist device for an air vehicle, such as an unmanned air vehicle is provided. The device features an electric motor and is much less complex and lighter than takeoff assist devices heretofore known. A body member is shaped to fit to a portion of the air vehicle. The body member defines a housing in which the majority of the components are housed, including the electric motor, a motor controller, an electrical power source and a main controller. A propeller is attached to a shaft of the electric motor outside of the housing and rotates with a shaft of the electric motor. In addition, there is a latch mechanism that removeably attaches the body member to the host air vehicle for takeoff, and then is controlled to release from the air vehicle after it is airborne at a desired airspeed and altitude. The electric motor-driven takeoff assist device can launch an air vehicle with minimal auxiliary equipment and can be remotely controlled to launch from a site at which a takeoff ready vehicle can be left for extended periods of time.

28 Claims, 10 Drawing Sheets

ELECTRIC MOTOR ASSISTED TAKEOFF DEVICE FOR AN AIR VEHICLE

FIELD OF THE INVENTION

The present invention relates to a takeoff assist device for a small aircraft, and more particularly to an electric motor driven takeoff assist device for unmanned air vehicles.

BACKGROUND OF THE INVENTION

Jet and rocket assisted takeoff modules have been in use for many years to provide reduced takeoff field size requirements for both manned and unmanned aircraft. These devices comprise one or more jet or rocket motor modules that attach to the aircraft to provide increased thrust and thus acceleration during takeoff. The device separates from the host aircraft once it is airborne to minimize the performance impact to the host aircraft.

Jet and rocket assisted takeoff modules have serious limitations. Due to their pyrotechnic nature they are dangerous to use onboard ships at sea and/or for use on submarines. In addition, jet and rocket assisted takeoff modules produce a visible plume and create an easily detectable acoustic and heat signature that makes them unacceptable for covert operations. In addition, jet and rocket assist takeoff devices have complex logistics for transporting, storing and operation given their explosive nature.

SUMMARY OF THE INVENTION

Briefly, a takeoff assist device for an air vehicle, such as an unmanned air vehicle, is provided. The device features an electric motor and is much less complex and lighter than takeoff assist devices heretofore known. A body member is shaped to fit to a portion of the air vehicle. The body member defines a housing in which the majority of the components are housed, including the electric motor, a motor controller, an electrical power source and a main controller. A propeller is attached to a shaft of the electric motor outside of the housing and rotates with a shaft of the electric motor. In addition, there is a latch mechanism that removeably attaches the body member to the host air vehicle for takeoff, and then is controlled to release from the air vehicle after it is airborne at a desired airspeed and altitude.

The electric motor-driven takeoff assist device can launch an air vehicle with minimal auxiliary equipment and can be remotely controlled to launch from a site at which a takeoff ready vehicle can be left for extended periods of time. The power source is a battery that is capable of storing a charge for a relatively long period of time, but also capable of discharging rapidly to enable the motor controller to drive the electric motor at a speed well above its normal continuous operation conditions for a relatively short period of time that is sufficient to get the host air vehicle airborne and ready for self-sustained flight. In addition, the takeoff assist device creates little or no detectable visible, heat or acoustic signature.

DETAILED DESCRIPTION

Figure 1:
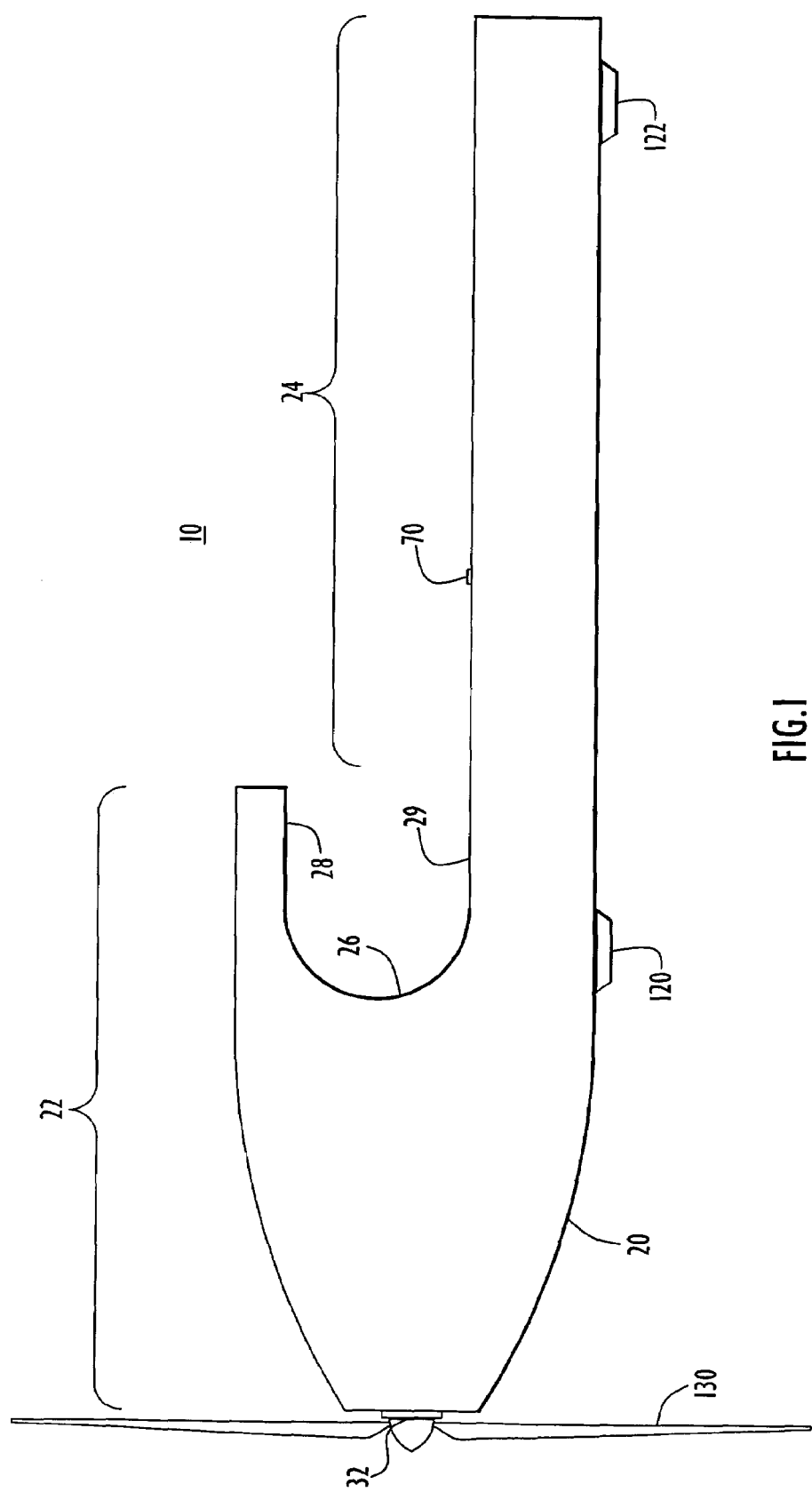
FIG. 1 is side view of the electric assist takeoff device according to the invention.
Figure 2:
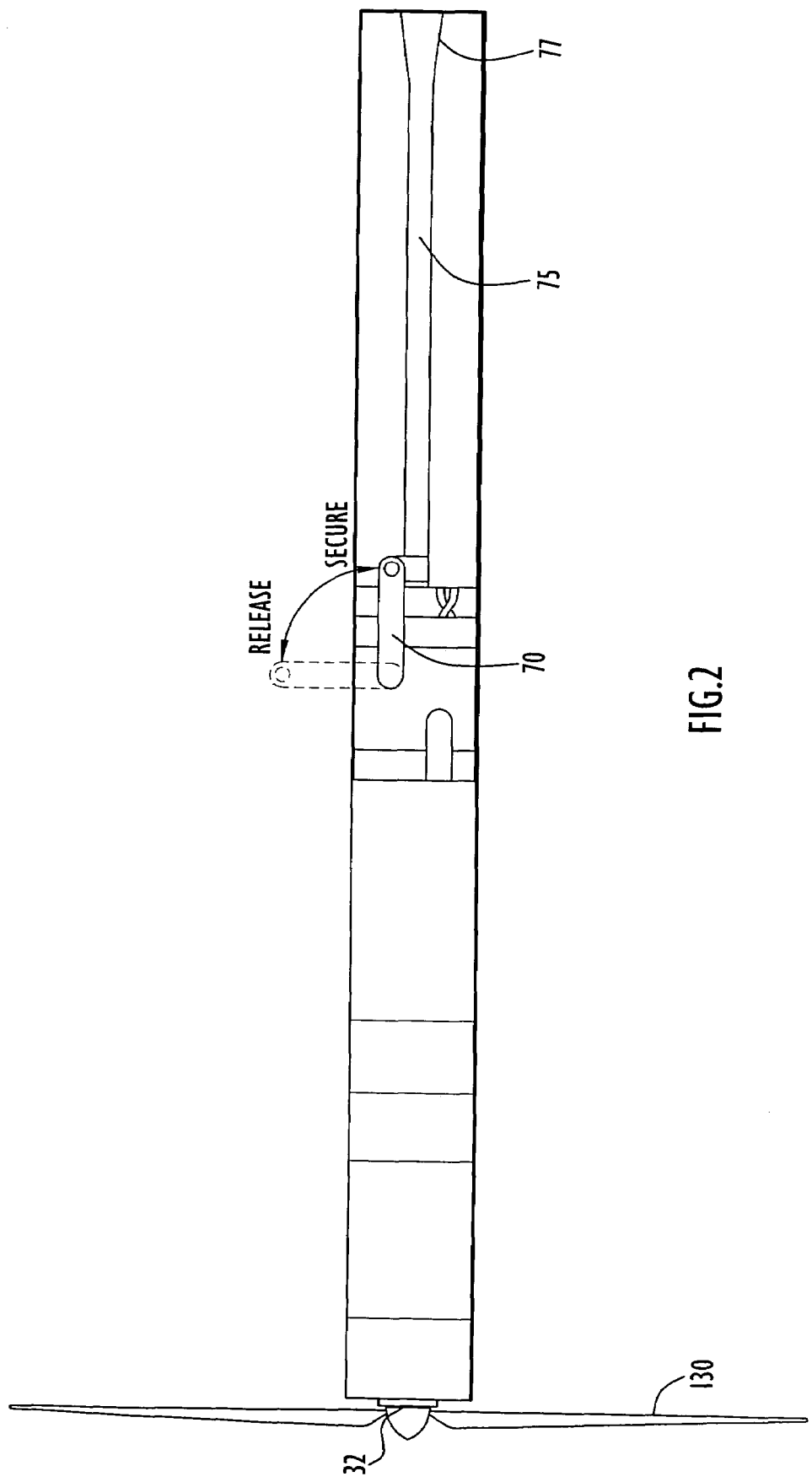
FIG. 2 is a top view of the electric assist takeoff device according to the invention.
Figure 3:
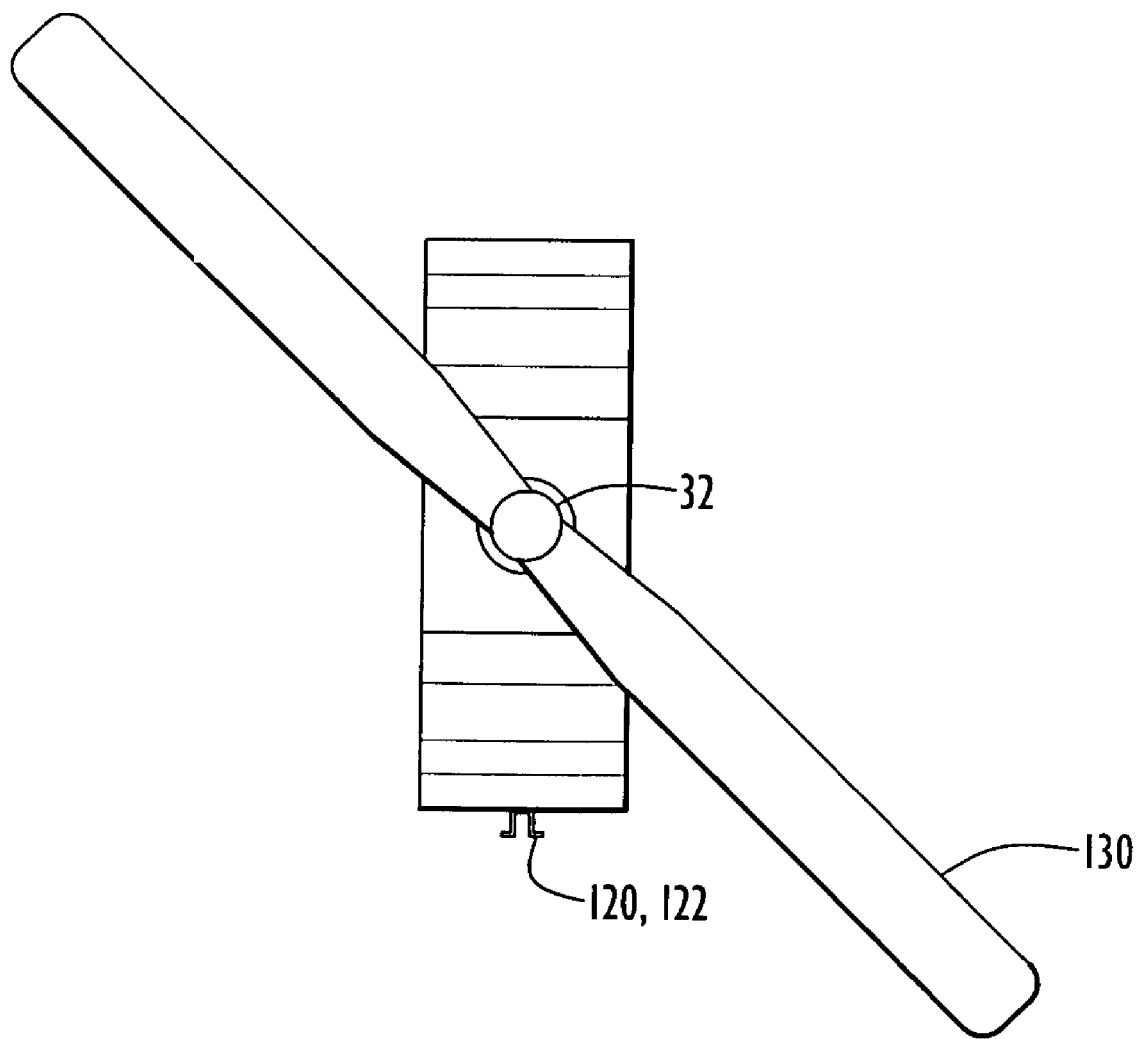
FIG. 3 is front view of the electric assist takeoff device according to the invention.
Figure 4:
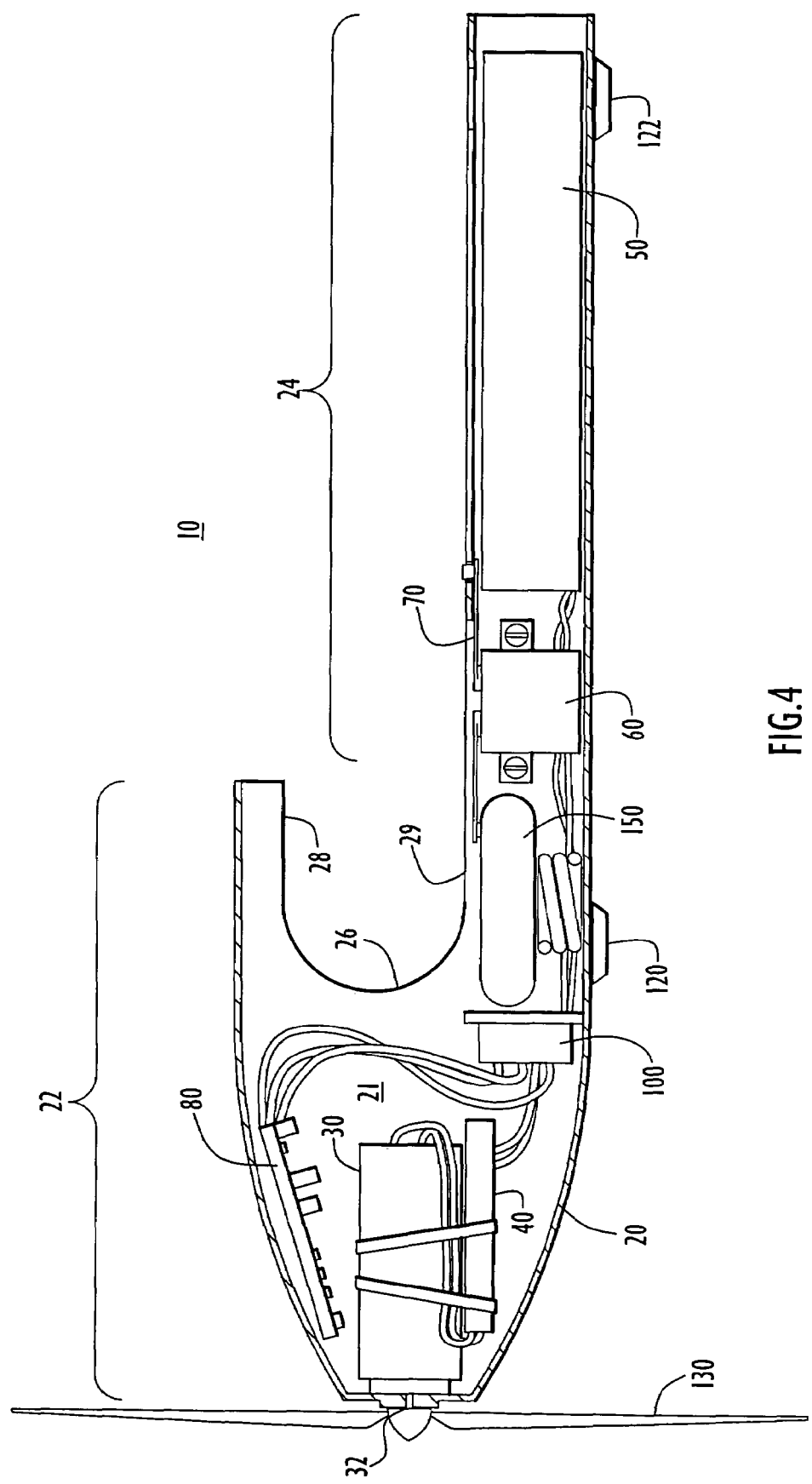
FIG. 4 is a side cut-away view of the electric assist takeoff device according to the invention.

Referring first to FIGS. 1-5, the electric assist takeoff device shown generally at reference numeral 10 is described where FIG. 1 shows a side view of the exterior of the takeoff device 10, FIG. 2 shows a top view of the exterior of the takeoff device 10, FIG. 3 shows a front view of the takeoff device 10 and FIG. 4 shows a side cut-away view of the takeoff device 10 in which the components in the interior of the device 10 can best be seen.

The takeoff device 10 comprises a body shell member 20 that contains an electric motor 30, a motor controller 40, a battery pack or sub-system 50 and a servo mechanism 60, a latch 70, a radio receiver 80 and a main controller 100. The body shell member 20 may, but need not be, of a shape that conforms to the shape of a host air vehicle so as to removeably fit over a nose portion of the host air vehicle. For example, body shell member 20 has a conical nose shape portion 22 to follow the contour of a nose portion of host air vehicle and an elongated cylindrical portion 24 that follows a contour of a portion of a fuselage of the host air vehicle.

As best shown in FIG. 4, the body shell member 20 defines a housing 21 for containing the electric motor 30, motor controller 40, battery sub-system 50, servo mechanism 60, radio receiver 80 and main controller 100. The body shell member is enclosed at a proximal portion of the nose shaped portion 22 shown at 26 where a nose of a host air vehicle would mate such that the side walls 28 and 29 of the body shell member engage sides of the nose of the host air vehicle. The body shell member 20 may be formed of a balsawood core with a fiberglass coating, or for higher production, made of vacuum formed plastic or other suitable material. Also shown in FIG. 1 is an optional parachute and associated parachute release mechanism 150 to allow for recovery of the device 10 after use. On one side of the body shell portion 22 are takeoff guide tabs 120 and 122 that are used to fit within a track of a takeoff or launch device.

The electric motor 30 has a shaft 32 that attaches to a propeller 130 mounted to the shaft 32 outside of the housing 21. The electric motor 30 is designed to provide a very high power to weight operation for a short duty cycle for takeoff assistance. An example of a suitable electric motor is a high power brushless electric motor. An example of an electric motor is a NEU1509 brushless motor. The NEU1509 electric motor can operate at 30 volts and 80 amps producing approximately 20 lbs of thrust using a Bolly 18-8 propeller. This is well above the manufacture "rated" continuous operating conditions for the motor, but since it is being operated only for a very short time, the normal rated continuous operation conditions can be exceeded in order to obtain more power (that would otherwise require a larger electric motor) from a smaller motor, minimizing the weight of the takeoff assist device 10. Of course, if an electric motor is available that can be driven sufficiently fast within its normal operating conditions and is sufficiently light weight, it is also useful in the takeoff device 10.

The motor controller 40 generates a power waveform required by the electric motor 30 from electrical current supplied by the battery sub-system 50. A brushless motor is essentially an AC system, and the battery sub-system provides a DC current. The motor controller 40 receives the start/stop signals from the main controller 100 to control the electric motor operation. Such motor controller devices capable of converting a DC signal to an AC signal for motor control are well known in the art.

The battery sub-system 50 serves as the electrical power source for the motor and the other components of the device 10. An example of a suitable battery technology is a Lithium battery that can maintain its charged state for a relatively long period of time prior to use. In addition, due to the short run time of the electric motor 30, the battery(ies) in the battery sub-system 50 may be discharged at faster rates than for normal (continuous) operations, again contributing to reducing the size/cost/weight of the battery system. Battery discharge rates are commonly given as "C", and as an example a Thunderpower 4000-8S2P Lithium polymer battery pack having a 22C burst discharge rate is suitable for the device 10. Again, the Lithium polymer battery is chosen because it will retain its charge for a long on-the-shelf period (unlike NiCad or NiMH which self-discharge fairly rapidly) making it more suitable for an application where it may be used infrequently. Several off-the-shelf Lithium polymer batteries may be connected together in series to provide sufficient electrical current to drive the electric motor 30.

The servo mechanism 60 and latch 70 form a latching system that provides a mechanical attachment means to the host air vehicle. The latch 70 is an L-shaped arm member that can be rotated by the servo mechanism 60 in the directions as best shown by the arrow in FIG. 2 to engage and disengage from an existing structural element on the air vehicle, such as a lug member on the bottom surface of the host air vehicle that is typically inserted into a track of a launch apparatus. There is a track, slot or groove 75 along the bottom of the fuselage portion 24 of the device 10 that receives the lug member of the host air vehicle at a receiving portion 77. The servo mechanism 60 is a small motor or solenoid driven device that can rotate the latch between two positions (secure and release positions) in response to a control signal from the main controller 100. Numerous other latch mechanisms may be used instead of the latch arm member, such as a magnetic latch mechanism, retractable hook into a slot on the air vehicle, an extensible pin and matching socket on the host vehicle, suction cup, or any other system that uses elements already present in the to be launched vehicle or can be easily modified to the vehicle.

The radio receiver 80 may be any suitable receiver capable of receiving radio signals. Alternatively, the receiver may be an infrared (IR) receiver for receiving IR signals, or any other wired (by a connecting umbilical) or wireless signal transmitted by a transmitter device. In any case, the receiver 80 receives a takeoff signal from a remote transmitter and in response thereto generates a trigger signal that is coupled to the main controller.

Figure 5:
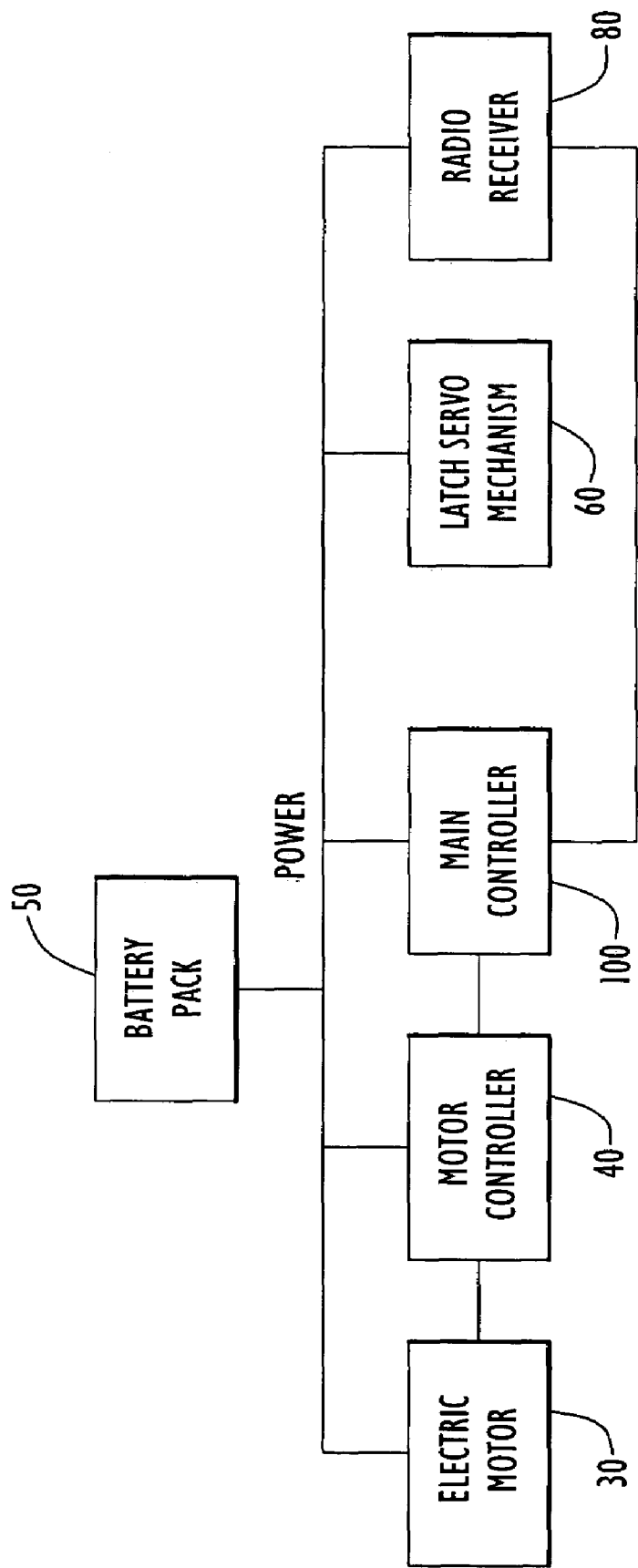
FIG. 5 is a block diagram of the electrical systems in the takeoff device according to the invention.

Turning to FIG. 5, the electric system of the device 10 will be further described. The main controller 100 is, for example, a programmable microprocessor or microcontroller that operates the various modules of the device 10. The main controller 100 is connected to the motor controller 40. In particular, the main controller 100 is programmable to determine when to initiate the takeoff procedure, either based on a programmed time event, or in response to the radio receiver 80 receiving a remote takeoff signal and generating a trigger signal. Alternatively, the device 10 may be triggered to takeoff manually by an appropriate button or other user interface on the exterior of the body member and coupled to the main controller 100. The main controller 100 generates signals to control the start and stop the motor controller 40 thereby controlling the time duration of the takeoff cycle. In addition, upon completion of the takeoff cycle, and before the electric motor 30 is off, the main controller 100 generates a latch release signal that is coupled to the servo mechanism 60 to move the latch 70 from the secure position to the release position thereby allowing the device 100 to fly off and away from the host air vehicle. This release functionality is described further hereinafter.

Figure 6:
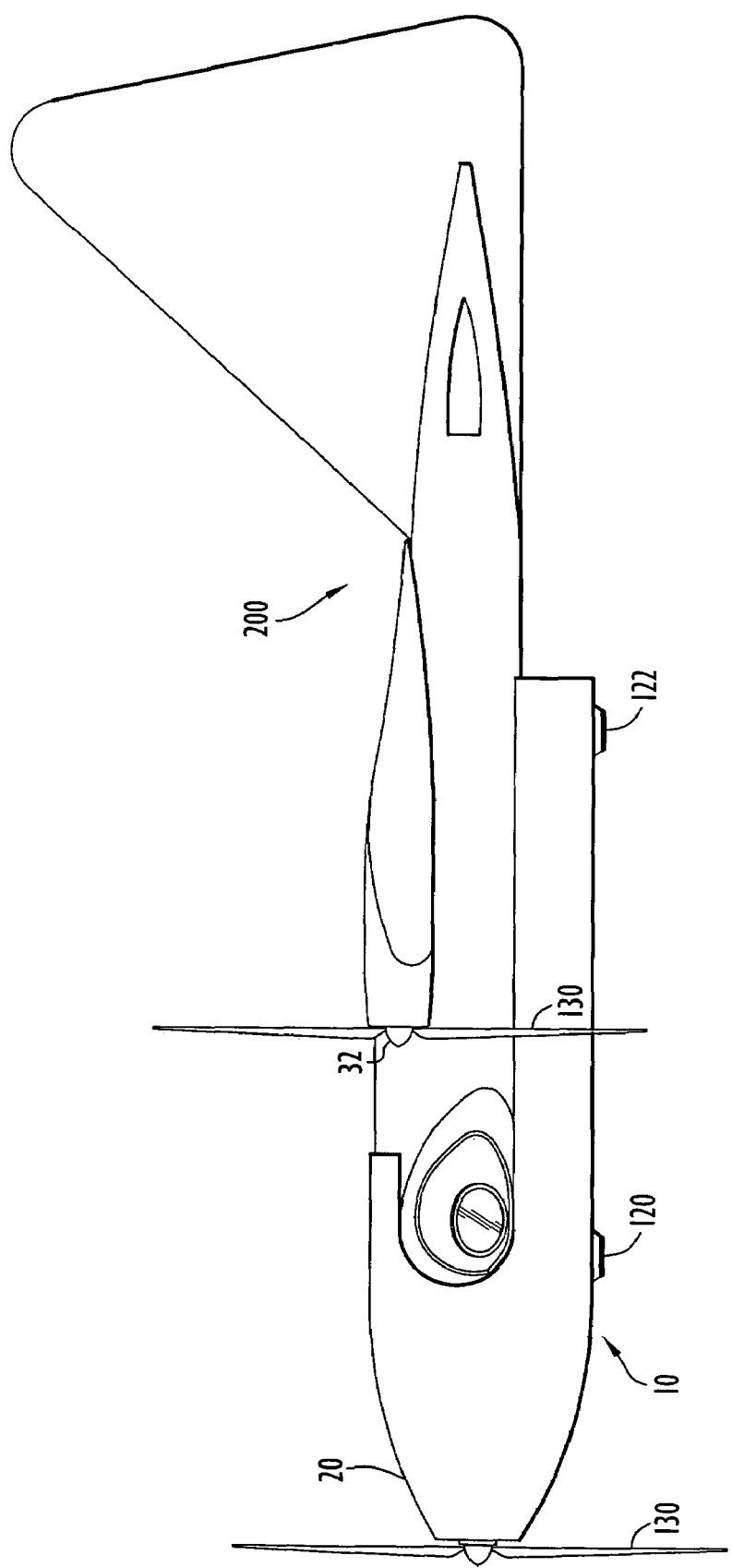
FIG. 6 is a side view of the electric assist takeoff device attached to an air vehicle.
Figure 7:
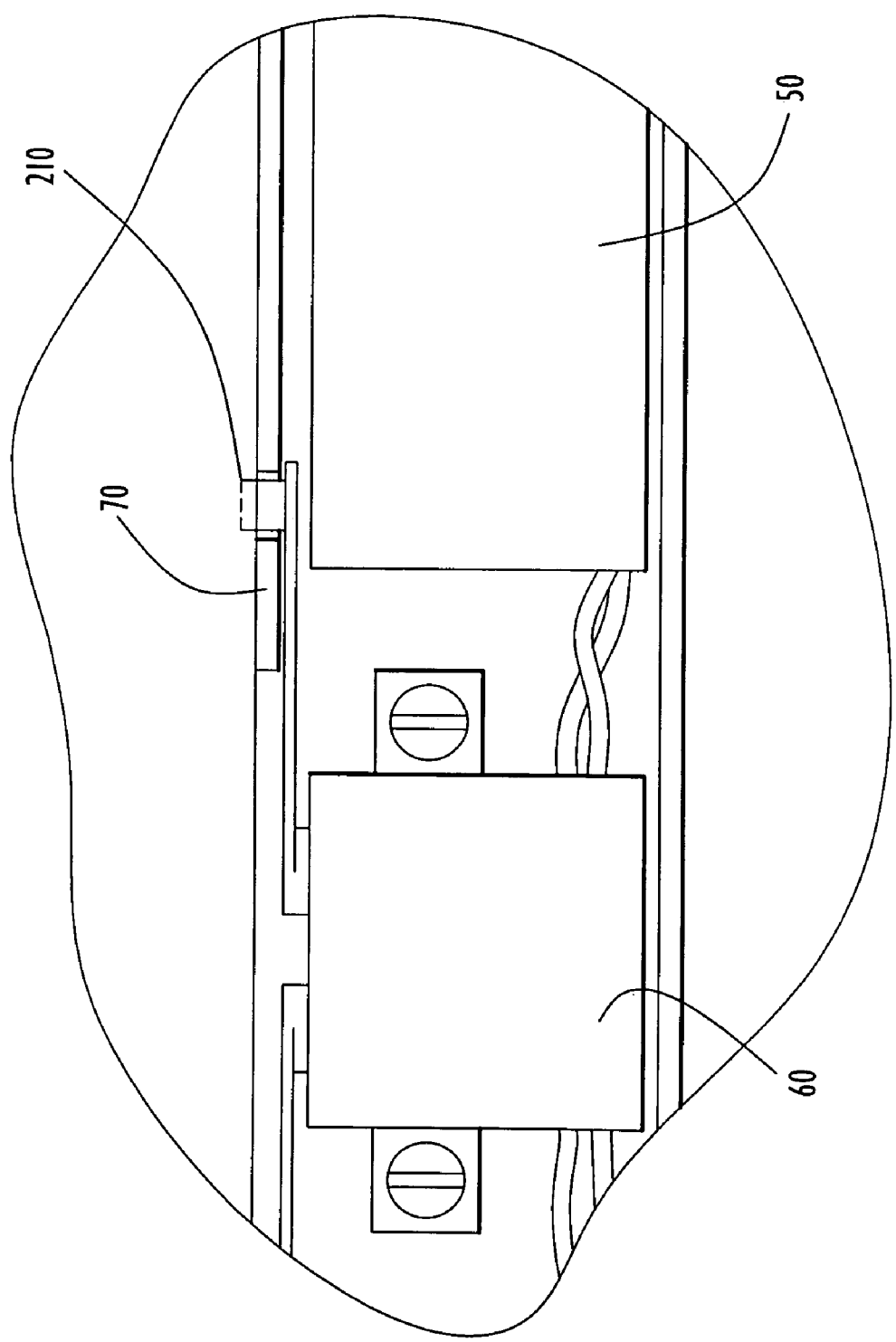
FIG. 7 is an enlarged cut-away view showing the latch securing the takeoff device to the air vehicle.

With reference to FIGS. 6-10, the operation of the device 10 on a host air vehicle will be described. The host air vehicle shown at reference numeral 200 is, for example, an unmanned air vehicle that is remotely or auto-pilot controlled. The battery sub-system is suitably charged and installed inside the device 10. The device 10 is slid over the nose of the host air vehicle 200 and a lug member 210 on the bottom of the host air vehicle 200 slides into the track (FIG. 2) 75 on the bottom of the device 10 and eventually in position to engage the latch member 70 in its secure position as shown in FIG. 6. At this time, the server mechanism 60 is set to keep the latch member 70 in the secure position. The device 10 remains attached to the host air vehicle for as long as the air vehicle 200 is to remain takeoff ready. FIG. 7 also shows the device 10 secured to the host air vehicle 200.

Figure 8:
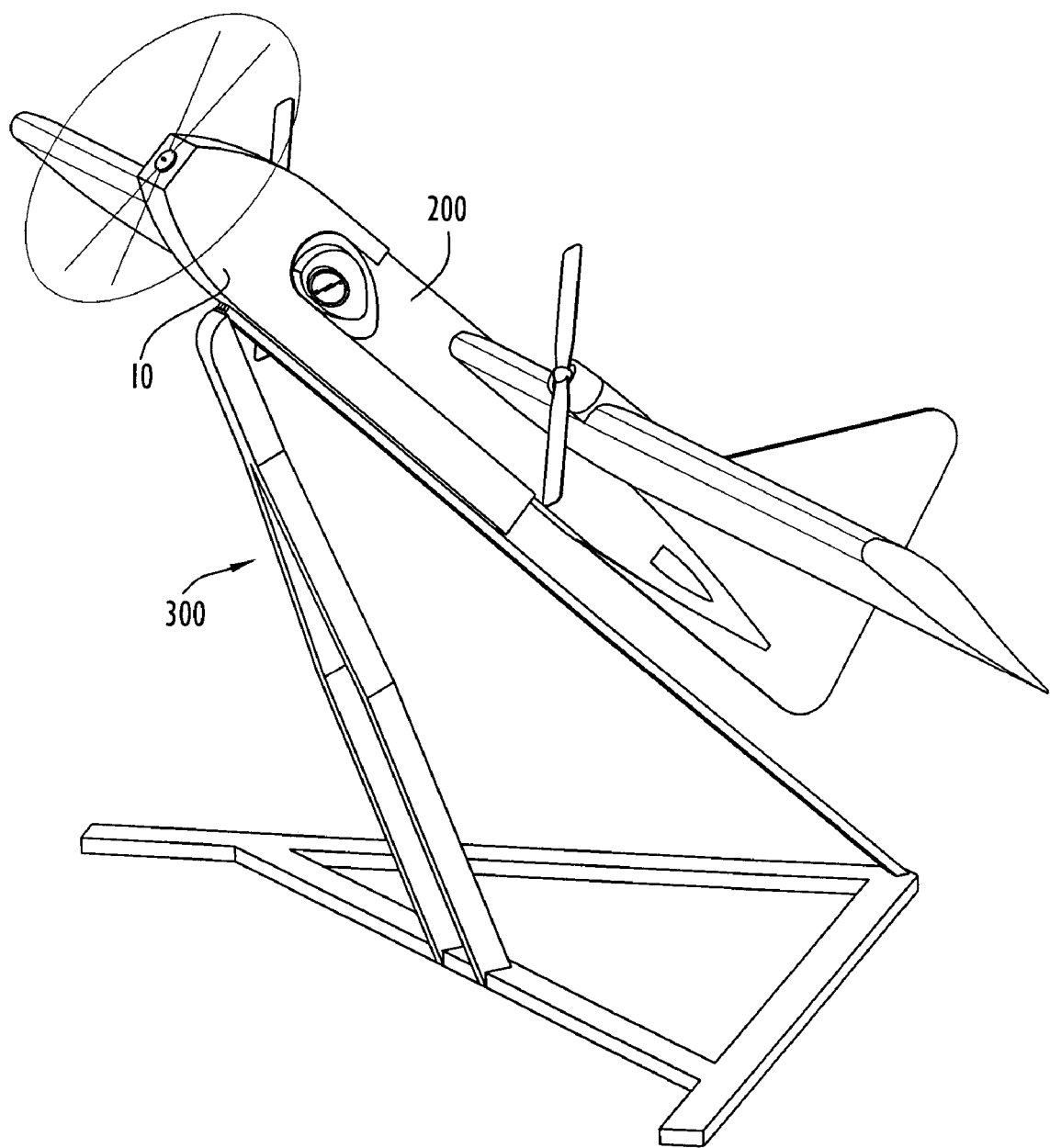
FIG. 8 is a perspective view of an air vehicle having the electric takeoff device attached thereto and on a launch device ready for takeoff.

With reference to FIG. 8, the host device 10 may be mounted on a launch device 300 that has a track with a slot to receive the tabs 120 and 122 on the bottom of the host device 10 as best shown in FIGS. 1 and 3. The launch device 300 with the takeoff-ready air vehicle 200 in position may be left at a remote site either on land, or it may be adapted to be left in water if the launch device has suitable flotation devices. Again, the launch device 300 and takeoff ready air vehicle 200 may remain at a launch site for an extended period of time, up to a year or more, for example. In response to a manual launch signal, a pre-programmed takeoff time stored in the main controller 100, or a transmitted takeoff command signal that is received by the radio receiver 80, the main controller 100 starts a takeoff sequence by which it (disengages a launch latch, not shown, to prepare the takeoff ready air vehicle to depart from the launch device 300) and supplies a start signal to connect electrical current from the battery sub-system 50 the motor controller 40. The motor controller 40 generates an AC power waveform from the DC current to drive the electric motor 30 to take the air vehicle off the launch device 300 and become airborne. As explained above, the electric motor 30 may be operated at a much higher power than what it is rated for normal continuous operation, but the takeoff device 10 it is used only once and for a very short duration. Thus, the desired takeoff power can be provided with a much smaller propulsion element than would otherwise be used, such as with jet assisted or rocket assisted devices.

Figure 9:
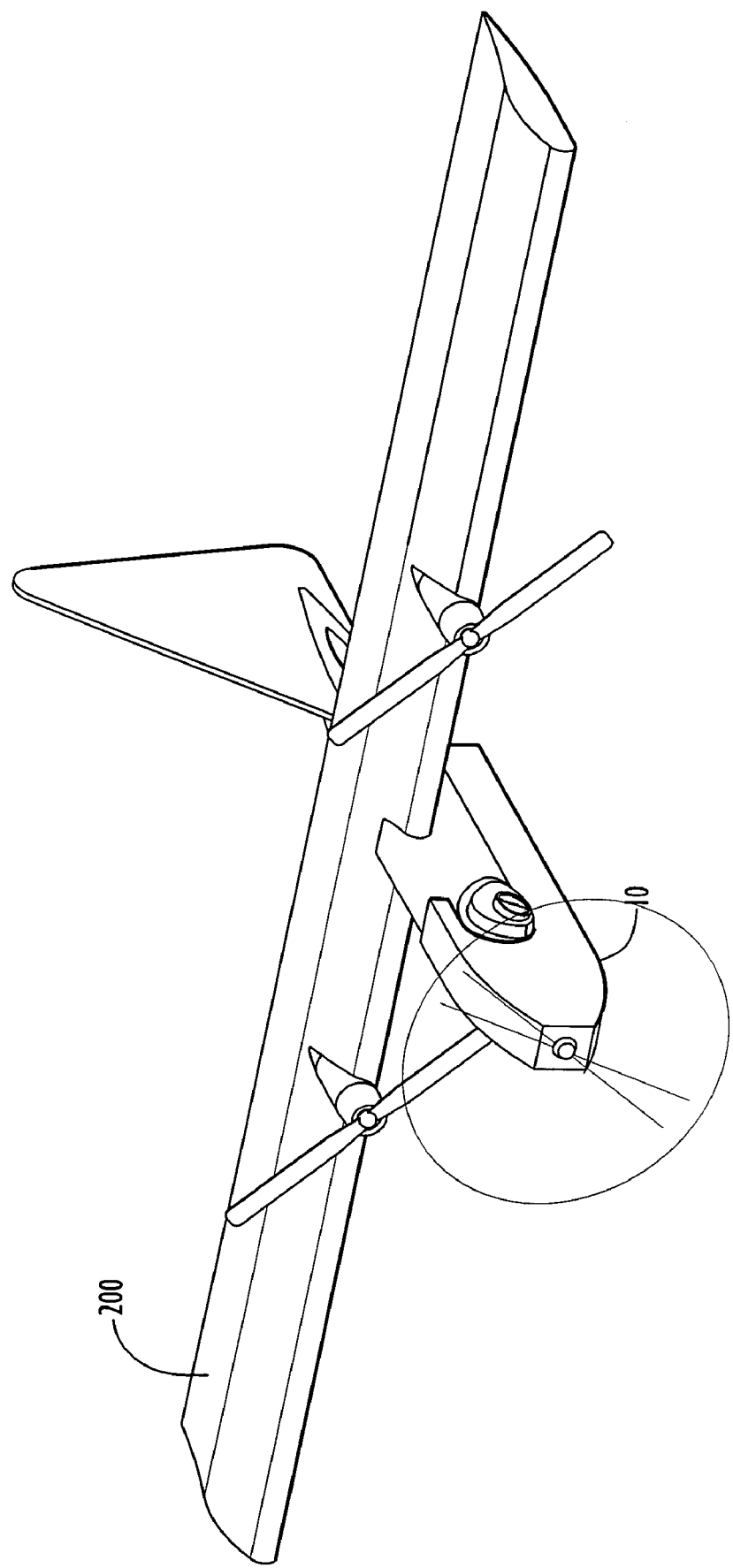
FIG. 9 is a perspective view of an air vehicle in flight under power of the electric takeoff device attached thereto.
Figure 10:
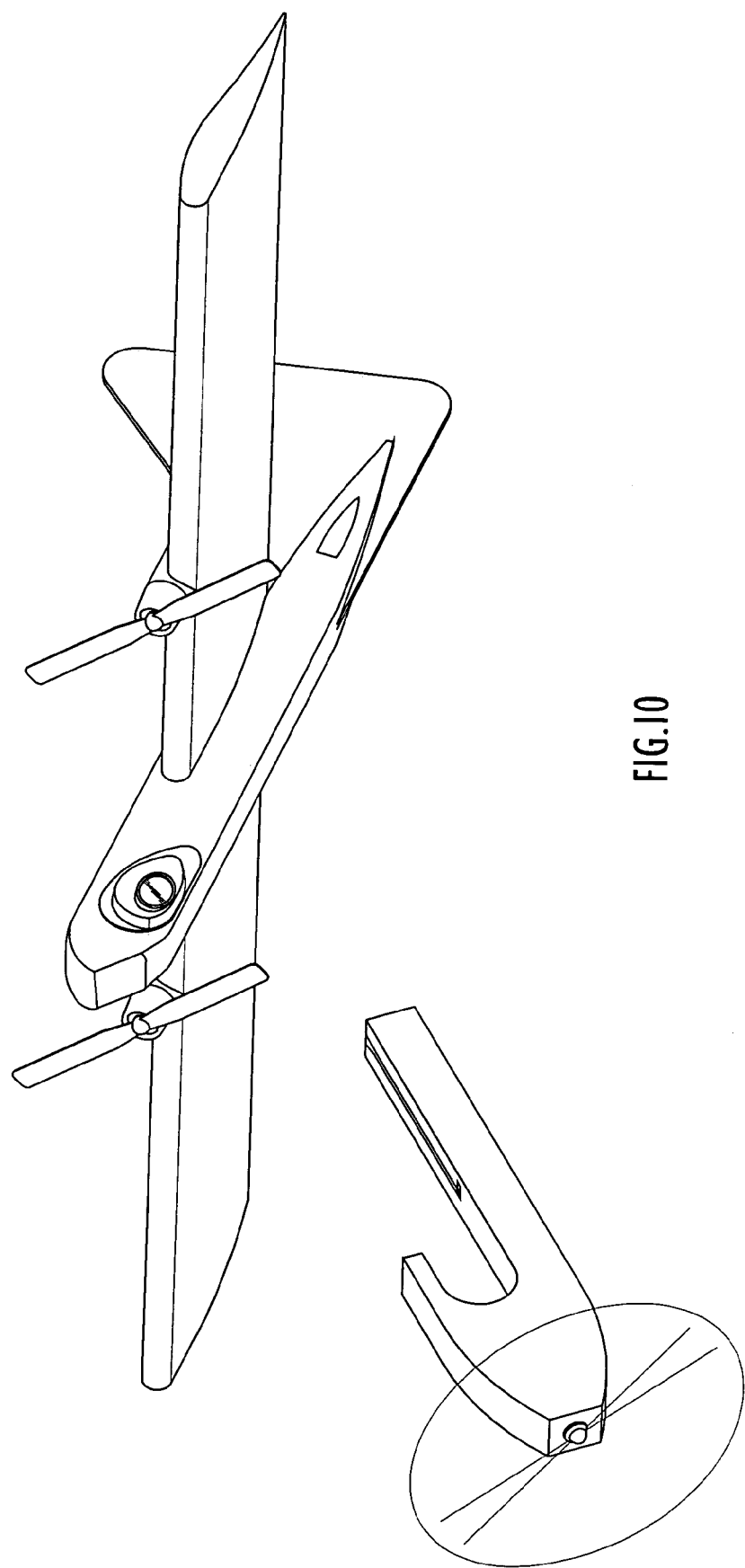
FIG. 10 is a perspective view of the electric takeoff device detached and flying away from the air vehicle after the takeoff assist cycle is complete.

As shown in FIG. 9, the device 10 remains attached to the air vehicle 200 and the electric motor 30 is still operated until the assist takeoff device/air vehicle assembly reaches a suitable altitude and air speed measured by sensors on the air vehicle or known beforehand through test flights to occur after a predetermined time period. The battery sub-system rapidly discharges during the on-time of the electric motor to enable the motor controller 40 to produce the AC power waveform needed to drive the motor at the heightened power level. The main controller 100 will then trigger the servo mechanism 60 to move the latch member 70 to its release position with the electric motor 30 still running. The device 10 will then detach and fly away from the from the air vehicle 200 under power of the electric motor 30 as shown in FIG. 10. An example of the duration that the takeoff vehicle remains attached to the host air vehicle during the takeoff assist cycle is 4-5 seconds. Some period of time after detaching from the host air vehicle 200, the main controller 100 will generate a stop signal that will discontinue supply of DC current to the motor controller 40 so that the electric motor 30 stops and the device 10 will fall from the air. In the meantime, the air vehicle is now airborne at a sufficient altitude and air speed and can activate its own motors to begin its self-sustained flight under control of its own navigation systems.

The advantages of the device 10 are manifold. First, the electric motor in the device 10 gives a negligible if not completely undetectable acoustic and heat signature the takeoff event of the air vehicle, which is desirable for covert applications. In addition, the deployment and takeoff logistics are quite simple. The battery-powered electric motor does not require any ancillary support equipment, unlike jet or rocket assisted takeoff devices. Moreover, the device can be used to launch the host air vehicle without any human assistance. A Lithium ion battery can be stored in an unused state for a relatively long period of time (approximately one year or more) so the air vehicle can be left at a particular location ready for use for a relatively long period of time without additional servicing.

In addition, device 10 provides a relatively low acceleration launch or takeoff profile because it is designed to get the air vehicle to a desired air speed and altitude in hundreds of feet rather than ten to fifteen feet as is common with jet/rocket assist or pneumatic launch systems. Therefore, the host air vehicle or launch equipment need not be modified to withstand large launch loads, common with prior art pneumatic launch systems. The takeoff device 10 also does not involve any explosives or fuel components that would be a hazard on a ship or submarine, and otherwise less reliable if left unused for a long period of time. In addition, the guide rail or track on the launcher 300 is much shorter than pneumatic systems, and in fact is shorter than the host air vehicle so that the propeller of the takeoff device 10 will have sufficient clearance. Furthermore, all of the elements of the takeoff device detach from the host air vehicle, leaving the air vehicle to perform normally.

The system and methods described herein may be embodied in other specific forms without departing from the spirit or essential characteristics thereof. The foregoing embodiments are therefore to be considered in all respects illustrative and not meant to be limiting.

What is claimed is:

1. A takeoff assisting device for an air vehicle comprising:
    a body member shaped to fit to a portion of the air vehicle, said body member defining a housing;
    an electric motor mounted in said housing;
    an attachment mechanism that removeably secures the body member to the portion of the air vehicle;
    a propeller member attached to a shaft of said electric motor outside of said housing and to rotate with the shaft of the electric motor;
    at least one electrical power source that stores electrical energy used for driving said electric motor; and
    a controller in the housing that activates the electric motor to lift the air vehicle from rest into the air and subsequently controls the attachment mechanism to cause the body member to detach and fly away from the air vehicle under power of said electric motor.

2. The device of claim 1, wherein the body member is shaped to removeably fit over a nose portion of the air vehicle.

3. The device of claim 1, and further comprising a motor controller mounted in said housing that is electrically connected to said electric motor, wherein said controller generates a signal that connects electrical current stored in said electrical power source to said motor controller which generates a waveform that drives the electric motor.

4. The device of claim 3, wherein said attachment mechanism engages a structural element on said air vehicle to secure the device to said air vehicle.

5. The device of claim 4, wherein said attachment mechanism comprises an arm that rotates between the first position in which it engages the structural element and the second position in which it releases from the structural element on said air vehicle to permit the device to detach from said air vehicle, wherein the controller generates a signal to cause the attachment mechanism to move from the first position to the second position.

6. The device of claim 1, and further comprising a receiver device that receives a wireless signal from a remote transmitter device to permit remote actuation of said electric motor.

7. The device of claim 1, wherein the body member comprises a first portion that is conical shaped to follow the contour of a nose portion of the air vehicle.

8. The device of claim 7, wherein the body member comprises a second portion that is elongated and is shaped to follow a contour of a portion of a fuselage of the air vehicle.

9. The device of claim 8, wherein said attachment mechanism is positioned on said second portion of the body member and engages a structural element on said air vehicle to secure the device to said air vehicle, and further comprising a groove formed along said second portion of the body member leading to the attachment mechanism to receive said structural element on the air vehicle.

10. The device of claim 1, wherein the body member further comprises tab members suitable for engaging a track of a launch device.

11. The device of claim 1, wherein the electrical power source is at least one Lithium polymer battery.

12. The device of claim 1, and further comprising a motor controller in said housing that is electrically connected to said electric motor, wherein the motor controller converts electrical current stored by said electrical power source to a waveform for driving the electric motor at operating conditions above normal continuous operating conditions for the electric motor but for a relatively short period of time.

13. A takeoff assisting device for an unmanned air vehicle comprising:
    a. a body member shaped to removeably fit to a portion of the air vehicle, said body member defining a housing;
    b. an electric motor mounted in said housing;
    c. a propeller attached to said electric motor outside of said housing and which rotates with a shaft of the electric motor;
    d. at least one battery in said housing that stores electrical charge for driving said electric motor;

e. an attachment mechanism that has a first position in which it engages a structural element on said air vehicle to secure the body member to said air vehicle and a second position in which it releases from the structural element on said air vehicle to permit the body member to detach from the air vehicle; and f. a controller in said housing, wherein the controller generates a start signal to actuate the electric motor to lift the air vehicle from rest into the air and subsequently generates a signal that causes said attachment mechanism to switch from said first position to said second position so that the device detaches and flies away from said air vehicle under propulsion of said electric motor.

14. The device of claim 13, wherein the body member has a portion that is shaped to removeably fit over a nose portion and a length of a fuselage of the air vehicle.

15. The device of claim 13, and further comprising a receiver device in said housing and coupled to said controller, wherein the receiver device receives a signal from a remote transmitter and in response thereto generates a trigger signal that is coupled to said controller, and wherein said programmable controller is responsive to said trigger signal to generate the start signal that actuates said electric motor.

16. The device of claim 13, wherein said body member comprises a slot formed on an exterior surface thereof that allows for passage of said structural element on said air vehicle.

17. The device of claim 13, wherein said attachment mechanism comprises an arm that rotates between the first position in which it engages the structural element and the second position in which it releases from the structural element on said air vehicle to permit the device to detach from said air vehicle.

18. The device of claim 13, and further comprising a motor controller connected to said electric motor and to said at least one battery, and wherein the motor controller is responsive to the start signal from the controller to convert electrical current stored by said at least one battery to produce a waveform for driving the electric motor.

19. The device of claim 18, wherein the motor controller converts electrical current stored by said at least one battery to the waveform for driving the electric motor at operating conditions above normal continuous operating conditions for the electric motor but for a relatively short period of time.

20. A takeoff assisting device for an unmanned air vehicle comprising:
a. motor means for rotating a shaft under electrical power;
b. propeller means coupled to the shaft for generating propulsion when driven by said motor means;
c. means for storing electrical current for driving said motor means;
d. controlling means that generates signals for controlling operation of said motor means;
e. housing means for containing said motor means, said means for storing electrical charge and said controlling means; and
f. means for removeably securing the housing means to the air vehicle;

g. wherein the controlling means generates a signal to actuate the motor means to lift the air vehicle from rest into the air and subsequently generates a signal that causes said means for removeably securing to detach said housing means from said air vehicle so that the device flies away from said air vehicle under propulsion of said motor means.

21. The device of claim 20, wherein the housing means is defined by a body shell that is shaped to removeably fit over a nose portion and a length of a fuselage of the air vehicle.

22. The device of claim 20, and further comprising receiving means in said housing means and coupled to said controlling means, wherein the receiving means receives a signal from a remote transmitter and in response thereto generates a trigger signal that is coupled to said controlling means, and wherein said controlling means is responsive to said trigger signal to generate the signal that actuates said motor means.

23. The device of claim 20, and further comprising a motor controlling means connected to said motor means, and wherein the motor controlling means is responsive to a signal from said controlling means to convert electrical current supplied by said means for storing to a waveform for driving said motor means.

24. The device of claim 23, wherein the motor controlling means converts electrical current stored by said means for storing to produce the waveform for driving the motor means at operating conditions above normal continuous operating conditions for the electric motor but for a relatively short period of time.

25. A method for assisting in the takeoff of an air vehicle, comprising:
a. placing a body member of a takeoff assist device over a portion of the air vehicle;
b. securing the body member to an existing structural element of the air vehicle;
c. actuating an electric motor contained in the body member with electrical current stored in at least one battery contained in said body member, so that the motor drives a propeller attached on an exterior of said body member to propel the air vehicle into the air; and
d. releasing the body member from the air vehicle while the electric motor is still running so that the takeoff assist device flies off and away from the air vehicle after the air vehicle has been propelled into the air to a desired altitude and/or air speed.

26. The method of claim 25, wherein releasing comprises releases a latch member that engages the existing structural element of the air vehicle.

27. The method of claim 25, and further comprising sensing altitude and/or air speed, and wherein releasing is responsive to determining that the altitude and/or air speed of the air vehicle has reached desired levels.

28. The method of claim 25, and further comprising deactivating the electric motor a period of time after the body member has released from the air vehicle.

* * * * *